Nov. 2, 1965  D. L. KLOEPPER ETAL  3,214,891
METHOD FOR MAKING ALCOHOL-FORMALDEHYDE PRODUCT
Filed Sept. 15, 1961
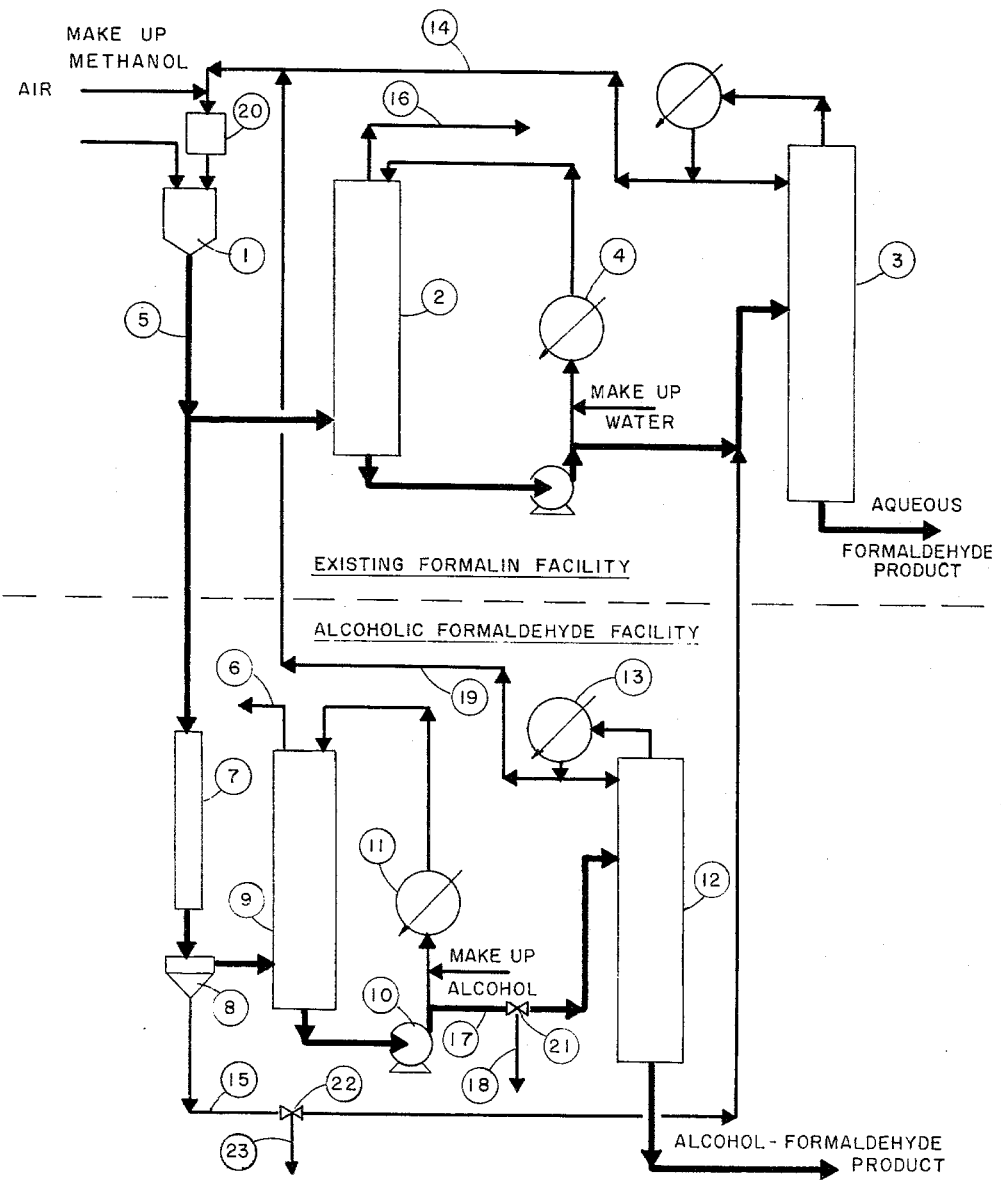
INVENTORS
Dean L. Kloepper
Lawrence G. Stevenson
BY United States Patent Office 3,214,891
Patented Nov. 2, 1965

3,214,891
METHOD FOR MAKING ALCOHOL-FORMALDEHYDE PRODUCT
Dean L. Kloepper, Mission, and Lawrence G. Stevenson, Merriam, Kans., assignors, by mesne assignments, to Gulf Oil Corporation, Pittsburgh, Pa., a corporation of Pennsylvania
Filed Sept. 15, 1961, Ser. No. 138,394
3 Claims. (Cl. 55—56)

This invention relates to a novel process for making alcohol-formaldehyde products, and more particularly to a process for making such products having low water content.

Recently alcohol-solutions of formaldehyde have become increasingly important in the production of specialty resins, particularly for use in protective coatings and in textile applications. Because it is important, in many instances, that such solutions have low water content, they are now ordinarily produced by dissolving paraformaldehyde in a solvent system chosen to yield an alcohol-formaldehyde product of specified composition. This method requires, first, the production of paraformaldehyde, and then the additional step of dissolving such material in the chosen alcohol. Another method is to produce an aqueous formaldehyde solution, highly enriched with respect to formaldehyde, and then add the required alcohol so as to produce the desired product.

The invention disclosed herein provides a superior process for producing alcohol-formaldehyde products. It also provides a process for making such products directly from a formaldehyde vapor stream. Further, it provides a process that can be incorporated into the design of an aqueous formaldehyde plant or readily integrated into existing aqueous formaldehyde facilities.

Briefly stated, the invention comprises partially condensing a gaseous formaldehyde stream to produce a water-enriched condensate and a formaldehyde-enriched vapor, separating the condensate and the vapor, and introducing the vapor into an alcohol absorber so as to absorb substantially all of the formaldehyde in an alcohol solution.

In the commercial embodiment, the gaseous formaldehyde stream would normally be produced by the oxidation of methanol; however, it may be any other suitable formaldehyde stream.

There are several commercial processes for producing, from methanol, a formaldehyde containing gas stream that can be partially absorbed in water to form an aqueous formaldehyde solution, or, in an alcohol, to form an alcohol-formaldehyde product. The most widely used methods are to pass a rich methanol-air mixture over a silver or copper catalyst to form a gas stream containing about fifteen percent free methanol, or to pass a lean methanol-air mixture over an iron-molybdenum catalyst to form a gas stream containing extremely small quantities of methanol.

The invention is illustrated in the attached drawing. It is a flow diagram of a process in which the feed stream consists of an effluent stream leaving a formaldehyde converter in which a methanol-air mixture is converted. The drawing also shows the alcohol-formaldehyde facility integrated with an aqueous formaldehyde plant. A feed stream of methanol vapor and air is introduced into a formaldehyde converter 1. This converter may be one of several types that are in commercial use and may produce an effluent stream having a methanol content ranging from essentially no methanol to as high as fifty percent methanol. The effluent leaving the converter also contains formaldehyde, water, and inerts consisting of mostly nitrogen, oxygen, carbon dioxide, carbon monoxide, hydrogen, and methane. These latter mentioned products are designated inerts because they are not absorbed in the alcohol absorber. Typical concentrations of products from a formaldehyde converter using a silver catalyst and a rich methanol-air mixture is from about ten percent to about thirty percent formaldehyde, from about five percent to about fifteen percent methanol, from about five percent to about twenty percent water, and from about seventy percent to about forty percent inerts. The gaseous effluent stream leaving the converter 1 in pipe 5 is divided into two parts; one part is delivered to the water absorber 2 in the conventional aqueous formaldehyde plant, and the other part is introduced into the partial condenser 7 of the alcohol formaldehyde facility. The residence time of the gas in the partial condenser 7 ranges usually from about 0.1 second to about five seconds. From about ten percent to about sixty percent of the feed stream entering the partial condenser 7 is condensed and the condensate is separated from the vapor phase in a mist separator 8 and delivered in pipe 15 to the feed stream of the methanol still 3 of the aqueous formaldehyde facility. Alternatively, the condensate may be delivered to the recirculating liquid of the water absorber 2 prior to passing through cooler 4. The vapor from the mist separator 8 is introduced near the bottom of an alcohol absorber 9. The vapor usually contains from about ten percent formaldehyde, three percent methanol, two percent water, and eighty percent inerts to about twenty-five percent formaldehyde, fifteen percent methanol, fifteen percent water, and fifty percent inerts. In the production of many preferred products, a water content less than about ten percent in the vapor is desired. The condensate leaving the mist separator 8 consists of about twenty-five percent to about forty percent formaldehyde, from about fifteen percent to about thirty percent methanol, and from about thirty percent to about fifty percent water, and essentially no inerts. Any one of several commercial types of absorbers, such as sieve tray columns, bubble cap columns, and vapor liquid contactors, may be used whereby the formaldehyde enriched vapor stream leaving the mist separator is absorbed in a circulating solution. The term formaldehyde enriched vapor stream means a vapor stream enriched in formaldehyde in relation to the water content of such vapor stream. The circulating solution consists of the alcohol that is desired in the final alcohol formaldehyde product, plus that portion of the inlet vapor stream entering the absorber from the mist separator 8 which is condensed in the circulating solution at the operating pressures and temperatures of the alcohol absorber.

The water, formaldehyde, and methanol, if any, in the vapor stream from the mist separator 8 introduced into the alcohol absorber 9 is absorbed by the circulating stream, and the unabsorbed vapors, containing mostly inerts, and a small amount of water, formaldehyde, and alcohol or alcohols, are vented in pipe 6. Although not shown in the drawing, the unabsorbed vapors leaving the column in pipe 6 may be scrubbed along with the vented vapors in pipe 16 from water absorber 2, usually with make-up water to the water absorber 2 in the aqueous formaldehyde facility, in order to recover any traces of formaldehyde, methanol, or other alcohol, and vented. The circulating stream is recirculated through the alcohol absorber 9 by means of pump 10. Make-up alcohol is continuously added to the circulating stream before such stream enters the absorption column. It is continuously added at a rate that will maintain the composition of the absorber circulating stream after equilibrium has been reached. Equilibrium is reached at different concentrations of alcohol depending upon the operating conditions and the alcohol used. The make-up alcohol and the portion of the stream leaving the bottom of the absorber that is recirculated is cooled by heat exchanger 11 before it is introduced into the absorber.

Any alcohol that is liquid at the absorption conditions may be employed, and the choice of the particular alcohol will depend largely upon the end use of the alcohol formaldehyde product. The alcohol is preferably water miscible at the absorption conditions such as for example methanol, ethanol, isopropanol, propanol, tertiary butanol, and isobutanol. Water immiscible alcohols such as n-butanol may be used. In those instances where the effluent stream leaving the formaldehyde converter contains substantial quantities of methanol, the circulating liquid entering the top of the absorption tower commonly consists of approximately twenty percent to about fifty percent formaldehyde, from about five percent to about twenty percent methanol, from about three percent to about twenty percent water, and from about twenty percent to about sixty percent of an additional alcohol or alcohols.

It is possible to diminish the methanol content of a formaldehyde converter effluent stream to such an extent that a final alcohol-formaldehyde product will be produced in the alcohol absorber and the additional methanol distillation step is not required to remove excess methanol. Valve 21 is operated so that the product from absorber 9 is delivered through pipe 18. Under such circumstances it is also sometimes possible to use the condensate from the partial condenser as a final aqueous formaldehyde product, thereby eliminating the necessity for the separate water absorber and methanol distillation operation of an aqueous formaldehyde facility. Valve 22 is operated so that the aqueous formaldehyde product is delivered through pipe 23.

The temperature of the vapor from the mist separator entering the alcohol absorber is approximately the dew point temperature of the formaldehyde converter effluent stream leaving the partial condenser. The inlet temperature of the liquid in such absorber may range from about 5° C. to about 50° C. and have a pressure range from about 5 p.s.i. to about 40 p.s.i. The outlet temperature of such circulating liquid may range from about 15° C. to about 70° C. and may have a pressure from about 5 p.s.i. to about 40 p.s.i. A portion of the solution leaving the absorber is delivered in line 17 to the methanol still 12 where excess methanol is distilled off so as to provide the desired product in the still bottoms. The methanol which is distilled overhead is returned as feed to the methanol vaporizer 20 in line 19 after being condensed in reflux condenser 13. Pipe 14 delivers the condensed overhead from methanol still 3 in the aqueous formaldehyde facility to the methanol vaporizer 20.

The still bottoms in the form of the desired alcohol formaldehyde product may range from about thirty to about seventy percent formaldehyde, from about 0.01 percent to about three percent methanol, from about three percent to about fifteen percent water, from about thirty to about seventy percent the desired alcohol, and a low content of inerts, if any. The outlet temperature of the still bottom ranges usually from 80° C. to about 150° C., having a pressure from about 5 p.s.i. to about 40 p.s.i. The methanol still overhead usually consists of from about 0.5 percent to about four percent formaldehyde, from about sixty percent to about one hundred percent methanol, from about 0.5 percent to about ten percent water, from about 0.01 percent to about five percent the added alcohol or alcohols, and essentially no inerts. The temperature range of the overhead is from about 68° C. to about 100° C. and the pressure of such vapor is from about 5 p.s.i. to about 40 p.s.i.

The invention will be further illustrated by the description relating to the specific examples of it. In these examples and elsewhere herein, all proportions are expressed in parts by weight unless specifically stated to the contrary.

Example 1

Effluent from a formaldehyde converter in which a rich methanol-air mixture is catalyzed by silver was divided into two streams, one stream going to a conventional aqueous formaldehyde plant, and the second stream going to the alcohol formaldehyde product facility. This gaseous stream contained 23.0 percent formaldehyde, 9.9 percent methanol, 12.3 percent water, and 54.8 percent inerts. The stream was introduced at the rate of 19.3 pounds per hour into the top of a vertically mounted, water cooled condenser at a pressure of one-half p.s.i.g. The gas was cooled to a temperature of from 118° C. to 60° during a 0.25 second residence time in the condenser. Approximately twenty percent of the gas stream was then rapidly removed as condensate from the vapor in a mist separator. The condensate consisted of 36.1 percent formaldehyde, 22.5 percent methanol, and 41.4 percent water. The uncondensed vapor stream leaving the mist separator consisted of 19.4 percent formaldehyde, 6.4 percent methanol, 4.2 percent water, and 70.0 percent inerts. The vapor leaving the mist separator was introduced near the bottom of a packed absorption column. The descending absorber circulating liquid consisted of 40.2 percent formaldehyde, 12.1 percent methanol, 8.1 percent water, 39.6 percent n-butanol, and essentially no inerts. The temperature of such circulating liquid entering the absorber was 35° C. at a pressure of about one-half p.s.i.g. The circulating liquid was circulated through the column at approximately ten gallons/minute-foot² based upon the empty tower cross sectional area. The vapors leaving the top of the absorber had an analysis of 0.23 percent farmaldehyde, 0.60 percent methanol, 1.27 percent water, and 0.08 percent n-butanol, and 97.82 percent inerts. A make-up stream of n-butanol was continuously added at a rate of approximately 4.35 pounds per hour so as to maintain a composition of the circulating stream as set out above. A side stream of the circulating solution was continuously withdrawn at the rate of 9.3 pounds per hour for distillation in a methanol still. The absorber product was diluted with n-butanol to maintain a formaldehyde to n-butanol ratio slightly in excess of that desired in the final product. A side stream of this material was distilled in the methanol still using conventional continuous distillation methods to yield a final product having an analysis of 42 percent formaldehyde, 49.0 percent n-butanol, 8.5 percent water, and 0.5 percent methanol. Final product specification material was made in a mixing tank by adding a small amount of alcohol prior to delivery to storage. The distillate contained approximately one percent formaldehyde, 93 percent methanol, five percent water, and 1.5 percent n-butanol. It was condensed in a reflux condenser upon leaving the methanol still and a portion returned to the methanol still as reflux. The remainder was sent to the methanol stream which was fed to the formaldehyde converter. The temperature of the still bottoms was 109° C. and the temperature of the distillate was 75° C. at atmospheric pressure.

Example 2

The procedure of Example 1 was followed except that isobutanol was used in the alcohol absorption tower rather than the n-butanol of Example 1. Calculated and measured operating conditions are set forth below in tabular form.

| Stream | Percent $CH_2O$ | Percent $CH_3OH$ | Percent $H_2O$ | Percent Iso-butanol | Percent Inerts | Temp., °C. | Pressure, p.s.i.g. |
|---|---|---|---|---|---|---|---|
| Converter Effluent | 24.0 | 9.0 | 13.0 | None | 54.0 | 114 | 1½ |
| Condensate | 28.5 | 27.7 | 43.8 | None | None | 60 | 1 |
| Vapor to Absorber | 20 | 6 | 4 | None | 70 | 60 | 1 |
| Absorber Circulating Liquid In | 38.8 | 14.1 | 7.9 | 39.2 | None | 41 | ½ |
| Absorber Circulating Liquid Out | 38.8 | 14.1 | 7.9 | 39.2+ | None | 50 | 1½ |
| Vent Gas | 0.4 | 1.0 | 1.5 | 0.05 | 97.05 | 41 | ½ |
| Still Bottoms | 42 | 0.5 | 8.5 | 49 | None | 108 | (¹) |
| Still Overhead | 1 | 92 | 5 | 1.5 | None | 75 | (¹) |

¹ Atmospheric.

*Example 3*

The procedure of Example 1 was followed except that the final product was a methanol-formaldehyde product having a low water content. The make-up alcohol in the alcohol absorber was methanol. The requirement for methanol distillation was eliminated because the final product is produced in the alcohol absorber. Approximate operating conditions are set forth below in tabular form:

| Stream | Percent $CH_2O$ | Percent $CH_3OH$ | Percent $H_2O$ | Percent Inerts | Temp., °C. | Pressure |
|---|---|---|---|---|---|---|
| Converter Effluent | 23.6 | 16.1 | 12.6 | 52.3 | 108 | 1 |
| Condensate | 35.1 | 34.8 | 30.1 | Neg. | 53 | ½ |
| Vapor to Absorber | 18.7 | 8.9 | 2.4 | 70.0 | 53 | ½ |
| Absorber Circulating Liquid In | 61.1− | 32.7+ | 6.2 | Neg. | 16 | (¹) |
| Absorber Circulating Liquid Out | 61.1+ | 32.7− | 6.2 | Neg. | 24 | 1− |
| Vent Gas | Neg. | Neg. | 0.5 | 99.5 | 16 | (¹) |

¹ Atmospheric.

By any of the processes described above, it is not necessary to isolate paraformaldehyde or even highly enriched aqueous formaldehyde as a distinct process step. This avoids deposition of paraformaldehyde in process lines and equipment, a major problem in the manufacture of paraformaldehyde. It also eliminates expensive distillation process operations. There are no additional distillation or energy costs incurred per unit of formaldehyde convert effluent produced. The polymerization problems and lower efficiencies encountered when concentrated solutions of aqueous formaldehyde are formed are also avoided.

The advantages of the instant invention are apparent from the foregoing discussion and description of the invention. It is to be understood that it is intended to cover all changes and modifications of the examples of the invention herein chosen for the purpose of illustration which do not constitute departures from the spirit and scope of the invention.

What is claimed is:

1. A method of producing a butanol-formaldehyde product having low moisture content comprising partially condensing a gaseous formaldehyde stream containing water and methanol to form a water-enriched condensate and a formaldehyde-enriched vapor containing methanol, separating said water-enriched condensate and said formaldehyde-enriched vapor, forming said butanol-formaldehyde product by absorbing said formaldehyde and methanol in said formaldehyde-enriched vapor in butanol, and removing methanol in excess of that concentration desired in said final butanol-formaldehyde product.

2. A method of producing a $C_2$ to $C_4$ alkanol-formaldehyde product having low moisture content comprising partially condensing a gaseous formaldehyde stream containing water and methanol to form a water-enriched condensate and a formaldehyde-enriched vapor containing methanol, separating said water-enriched condensate from said formaldehyde-enriched vapor, forming said $C_2$ to $C_4$ alkanol-formaldehyde product by absorbing said formaldehyde and methanol in said formaldeyhde-enriched vapor in $C_2$ to $C_4$ alkanol, and removing methanol in excess of that concentration desired in said final $C_2$ to $C_4$ alkanol-formaldehyde product.

3. A method of producing an isobutanol-formaldehyde product having low moisture content comprising partially condensing a gaseous formaldehyde stream containing water and methanol to form a water-enriched condensate and a formaldehyde-enriched vapor containing methanol, separating said water-enriched condensate from said formaldehyde-enriched vapor, forming said isobutanol-formaldehyde product by absorbing said formaldehyde and methanol in said formaldehyde-enriched vapor in isobutanol, and removing methanol in excess of that concentration desired in said final isobutanol-formaldehyde product.

References Cited by the Examiner
UNITED STATES PATENTS

| | | | |
|---|---|---|---|
| 1,905,033 | 4/33 | Bond | 260—606 |
| 2,257,780 | 10/41 | Bludworth | 260—606 |
| 2,675,346 | 4/54 | Maclean | 260—606 X |
| 2,676,143 | 4/54 | Lee et al. | 260—606 X |
| 2,690,994 | 10/54 | McCants | 260—606 X |
| 2,946,403 | 7/60 | Krueger et al. | 260—69 |
| 2,947,750 | 8/60 | Gerg | 260—69 X |
| 3,077,441 | 2/63 | Kodama et al. | 260—606 |
| 3,113,972 | 10/63 | Kodama et al. | 260—606 |

REUBEN FRIEDMAN, *Primary Examiner.*

HERBERT L. MARTIN, *Examiner.*